United States Patent [19]

Schramme et al.

[11] Patent Number: 4,645,057
[45] Date of Patent: Feb. 24, 1987

[54] DEVICE FOR COUPLING CARRIERS, SUCH AS SHOPPING CARRIERS AND LUGGAGE CARRIERS

[76] Inventors: Karin Schramme, Santisblick 6, D 7778 Markdorf; Theresia Bohler, Glashutten 19/1, D 7799 Ilmensee, both of Fed. Rep. of Germany

[21] Appl. No.: 701,105
[22] Filed: Feb. 13, 1985
[30] Foreign Application Priority Data
Feb. 14, 1984 [DE] Fed. Rep. of Germany ....... 3405101
[51] Int. Cl.$^4$ .............................................. B62B 3/00
[52] U.S. Cl. .................................... 194/246; 194/239; 194/344; 194/905; 280/33.99 C
[58] Field of Search ............. 194/4 D, 1 K, 905, 344, 194/239, 246, 245, 244; 280/33.99 R, 33.99 C, 33.99 A

[56] References Cited
U.S. PATENT DOCUMENTS

| 1,647,180 | 11/1927 | Kindrat et al. | 194/1 K |
| 2,723,017 | 11/1955 | Timms | 194/9 R |
| 4,063,629 | 12/1977 | Gordon | 194/1 K |
| 4,474,282 | 10/1984 | Lenander | 194/4 D |
| 4,573,564 | 3/1986 | Rheeder et al. | 194/905 X |
| 4,589,538 | 5/1986 | Payraudeau | 194/905 X |

FOREIGN PATENT DOCUMENTS
3127940 7/1981 Fed. Rep. of Germany.

Primary Examiner—Joseph J. Rolla
Assistant Examiner—P. McCoy Smith
Attorney, Agent, or Firm—McGlew & Tuttle

[57] ABSTRACT

A device for coupling carriers comprises a housing adapted to be mounted on the carrier and having a face with an opening forming a coupling trap. A flexible cable has one end secured to the housing and an opposite end extending out of the housing which has a plug thereon which is engageable in the coupling trap of an adjacent carrier. The housing also carries a releasable lock which is engageable with the plug to hold it in the trap when it is inserted therein. The device operates electrically under the control of a coin which passes through a coin chute in the housing and actuates an electrical switch which has an actuator portion in the chute. The switch is connected to the lock and it releases the lock and traps the coin in the chute so as to permit release of the plug from the trap and use of the carrier. When the carrier is returned and the plug is again inserted into the trap, the coin is released.

8 Claims, 5 Drawing Figures

DEVICE FOR COUPLING CARRIERS, SUCH AS SHOPPING CARRIERS AND LUGGAGE CARRIERS

FIELD AND BACKGROUND OF THE INVENTION

The invention relates in particular to a device for coupling shopping carts, suitcase carriers and the like with one another or with a fixed electric supply. The device includes a disengageable clutch formed of a trap and a clutch member for selective detachable coupling of the shopping carts in a space-saving stacked position, and of a coin operated catch by which, when fitting the shopping carts together, a clutch member attached to a shopping cart is engageable with the trap provided on the adjacent shopping cart and the coin is stopped when the clutch is disengaged and is released only after renewed coupling together.

A similar device is known from German OS No. 31 27 940. Here the coupling member is a rigid bar-like part which projects from a housing attached to the shopping cart in the lower region thereof and can be introduced automatically into a socket part on the opposite side at an adjacent shopping cart. In this way shopping carts can indeed be secured, in that the clutch is released only when by means of a coin an unlocking means is actuated; however, inserting the clutch members into the socket parts often entails considerable difficulties. Since the clutch and socket parts must have the same height position for them to be pushed one into the other, coupling may sometimes not be possible on uneven ground and special guide means are required for height equalization. But especially it is a disadvantage that by the rigid clutch members any vibration, caused in particular by the coupling of a shopping cart or by its removal, is transmitted to all circuit elements of the coupled carts and, in order to prevent any automatic release caused thereby, a protective resistance must be provided. Such protective resistances consume much current continuously, so that the operating costs are relatively high and also the contacts are under heavy stress. Therefore, despite the high cost of construction, smooth operation for a protracted period is not ensured with this safety means.

SUMMARY OF THE INVENTION

The invention provides a shopping cart coupling device of low cost construction which not only can be manufactured economically, but also has a high safety of operation for a long life. Especially it is to be achieved that shopping carts can be securely connected together easily and quickly, and this can be done also on uneven ground, and that the current consumption and hence the operating costs are minimized. Further, it is to be possible to retrofit shopping carts with such a device without having to make structural changes.

According to the invention, this is achieved in a shopping cart coupling device in which the clutch members are formed by a pull-resistant cable and by a plug, preferably a right angle plug, applied at the end of the cable and cooperating with a trap provided at an adjacent shopping cart.

Appropriately the trap is formed by a T-shaped recess preferably cut into a sidewall of a housing receiving the catch as well as the catch members of the clutch and the contacts and extending perpendicular to the longitudinal axis of the cart, which recess, to be able to absorb high tensile forces, should be provided with a plug abutment extending perpendicular to the longitudinal axis of the cart.

In addition, the plug should be provided with a receiving groove running in axial directions of the cart and having an axis-perpendicular bearing surface, for the armature of a magnet. Besides, to facilitate introduction of the plug, the plug, or, in the case of a right angle plug, the leg with the receiving groove, should have at its front end an insertion bevel.

To eject the plug, it is further desirable to insert in the plug or in the housing receiving it, a compression spring which, in the case of a right angle plug, acts preferably on an integrally formed web disposed between the legs thereof and guided in a slit in the housing.

In order that also high tensile forces can be transmitted, the cable should be fastened on the housing and on the plug resistant to pull by means of a pull rope inserted in the cable and provided at the ends with a nipple or the like.

The circuit elements of the catch and of the clutch should appropriately be arranged on a common circuit board which is installed in the housing receiving the components of the clutch and of the catch, so that a compact design results.

For the electrical connection of the plug, two contact jacks are advantageously provided, and, in the circuit board, contact pins to be introduced therein are also preferably multiple plugs.

To be able to retrofit shopping carts with the device according to the invention without difficulties, the preferably two-part housing receiving the components of the clutch, the catch as well as the circuit board should be arranged on the handle-bar of a shopping cart.

Further it is desirable to limit the coin chute of the catch at least on one of the two narrow sides by a removable insert piece attached on the circuit board. Thus the catch can be converted quickly to a different type of coin.

The device designed according to the invention for securing shopping carts is not only simple in construction and hence can be manufactured economically, but is also easy to handle and extremely safe to operate. If, in fact, the clutch member cooperating with the trap of an adjacent shopping cart consists of a flexible cable resistant to pull and of a plug at the free end thereof, it is possible to couple carts together, even on very uneven ground, by simply inserting the plug into the trap of the preceding cart of the stack. With the flexible cable any offset in height can be readily compensated, yet the union is resistant to pull. But especially it is of advantage that vibrations of any kind are not passed on by the cables and transmitted to the adjacent cart, hence the circuit elements of the clutch and of the catch are not stressed thereby. And as the microswitches are not exposed to vibrations, protective resistances are not necessary; the current drain and hence the energy consumption and consequently also the operating costs can thus be considerably reduced as compared with the aforementioned design. Combined with a simple installation of the device, high safety of operation for a long period of time is thus ensured.

Accordingly, it is an object of the invention to provide a coupling device for shopping carts and luggage carriers, etc. which includes a housing which is mounted on the cart and which contains the socket or trap on one face which is engageable by a plug carrier at the end of a flexible cable on the next adjacent cart which is secured to an opposite end of the housing.

A further object of the invention is to provide a device for coupling shopping carts and the like which is electrically coin operated to release a connecting cable and plug of one cart from a trap of a housing containing a cable and plug of another cart to trap the coin which is effective to make the release and return the coin only after the cart is again returned and the plug inserted.

A further object of the invention is to provide a coupling device which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
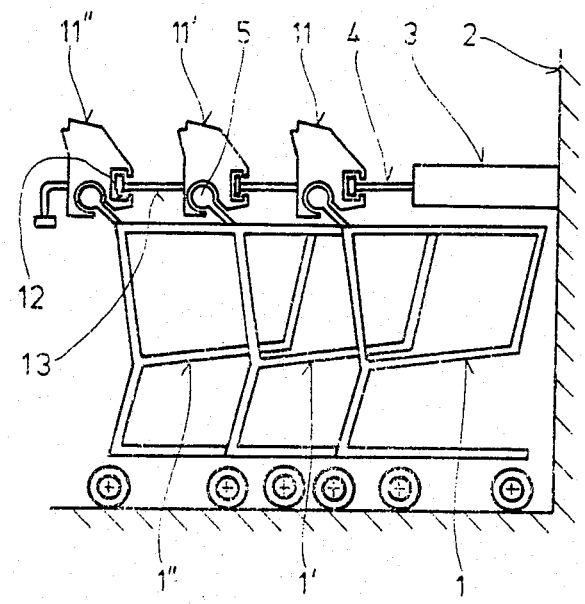
FIG. 1 is a schematic side elevational view of several shopping carts in stacked position coupled in accordance with the invention.

Referring to the drawings in particular the invention embodied therein comprises a coupling device for coupling a carrier such as a shopping carrier, luggage carrier and the like and which comprises a housing having parts 14 and 15 adapted to be mounted on the carrier such as a shopping cart designated 1. The housing has a face with an opening forming a coupling trap 12 and a flexible cable 13 has one end secured to the housing and an opposite end extending outwardly of the housing having a plug thereon which is engageable in a coupling trap of an adjacent carrier. The construction inlcudes releasable lock means 54 in the housing which are engageable with the plug 32 to hold it in trap 12. Means defining a coin chute 52 are provided in the housing along with electrical switch means 55 which has an actuator located in the chute and which is actuable by a coin 6 passing through the chute. Switch 55 is electrically connected to the lock means 54 to release the lock means and the switch actuator holds the coin in the chute. The coin is released and the plug 32 is again returned to a trap 12.

The shopping carts 1, 1', 1" . . . shown schematically in FIG. 1 are stopped in a stacked position by means of coupling devices or clutches 11, 11', 11" . . . disposed thereon. To achieve this, an electrical supply means 3 with a coupling member 4 is applied on a wall 2 of a building or other fixed structural part, and the coupling devices 11, 11', 11" . . . fastened on the handlebar 5 of the carts 1, 1', 1" . . . are detachably connected with the cart and with another.

The coupling devices 11, 11', 11" . . . each have a trap 12 as well as a clutch member 13, and in addition a coin operated catch 50 is associated with them, so that when fitting the carts 1, 1', 1" . . . together according to FIG. 1, the clutch members 13 can be made to lock with the trap 12 applied on an adjacent cart. With clutch 13 released, i.e. when a cart is detached from the stack, the coin 6 is stopped and is not released until after the cart has been coupled to a stack again.

Figure 3:
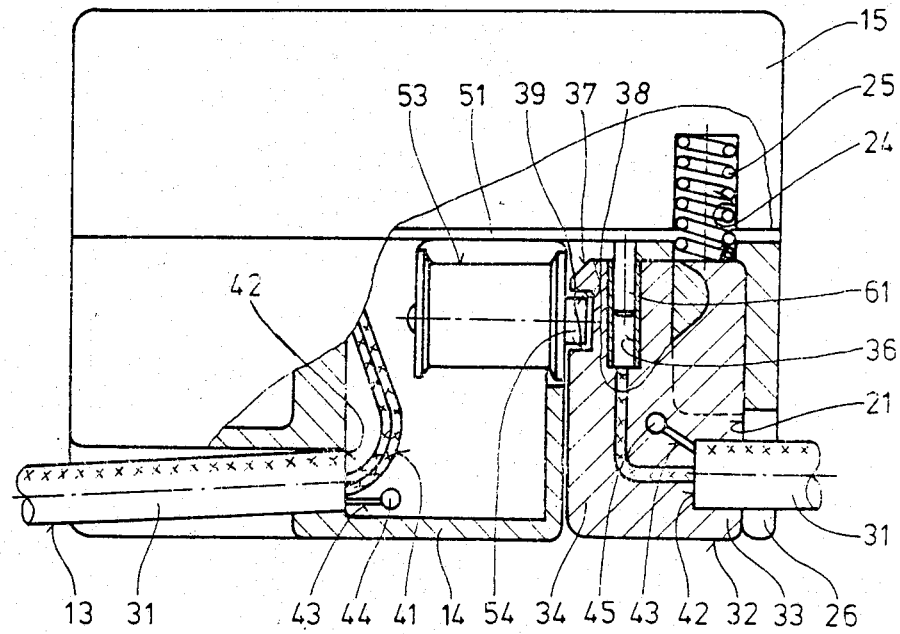
FIG. 3 shows an axis-perpendicular partial section through the clutch according to FIG. 2, which clutch member engaged in the trap thereof.
Figure 2:
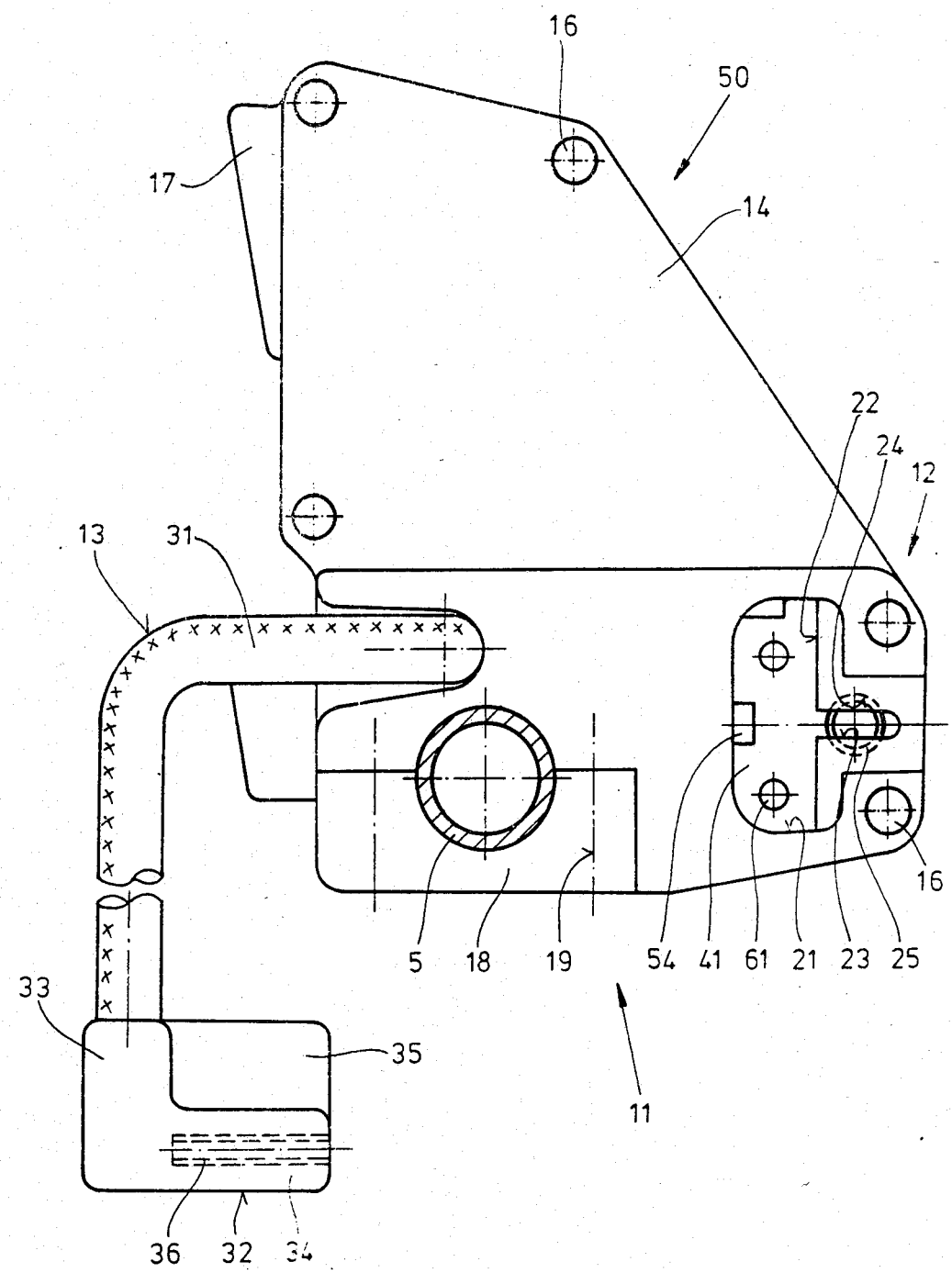
FIG. 2 is an enlarged partially sectional and elevational view of the clutch and catch applied on each of the shopping carts according to FIG. 1.

The trap 12 of coupling device 11 consists of a T-shaped recess 21 cut into a sidewall of one of the two housing parts 14 and 15 which receive the individual parts of clutch 13 and of catch 50 and are held together by screws 16. Clutch member 13, on the other hand, comprises a flexible high strength of pull resistant cable 31 and of a right angle plug 32 applied at the end thereof, which plug, as can be seen from FIG. 3, is insertable into recess 21. The two legs 33 and 34 of plug 32 are connected together by a web 35, and in housing part 14 a slit 23 into which web 35 can be introduced is cut in the region of recess 21.

Cable 31 includes current conductors 41 provided with a sheath 42, and is provided also with a pull rope 43, at whose ends nipples 44 and 45 are disposed which are firmly connected to the housing part 14 or respectively the right angle plug 52. In this way, especially since the right angle plug 32 applies by its leg 34 against an abutment surface 22 provided in recess 21 and extending axis perpendicular to the pulling direction, high tensile forces can be absorbed.

To facilitate the introducing of the right angle plug 32, there is formed at leg 34 thereof, in the front region, an insertion bevel 37, by means of which also the armature 54 of a electromagnet 53, which holds the right angle plug 32 by engagement in a recess 38 cut into leg 34 and having an abutment surface 39, can be pushed back counter to the force of a spring. With the magnet 53 excited, on the contrary, plug 32 is automatically pushed outward by a spring 25 which is inserted in a bore 24 cut into housing part 15. With plug 32 engaged, the cable 31 projecting therefrom is further additionally guided in a slit 26 cut in housing part 14.

Figure 4:
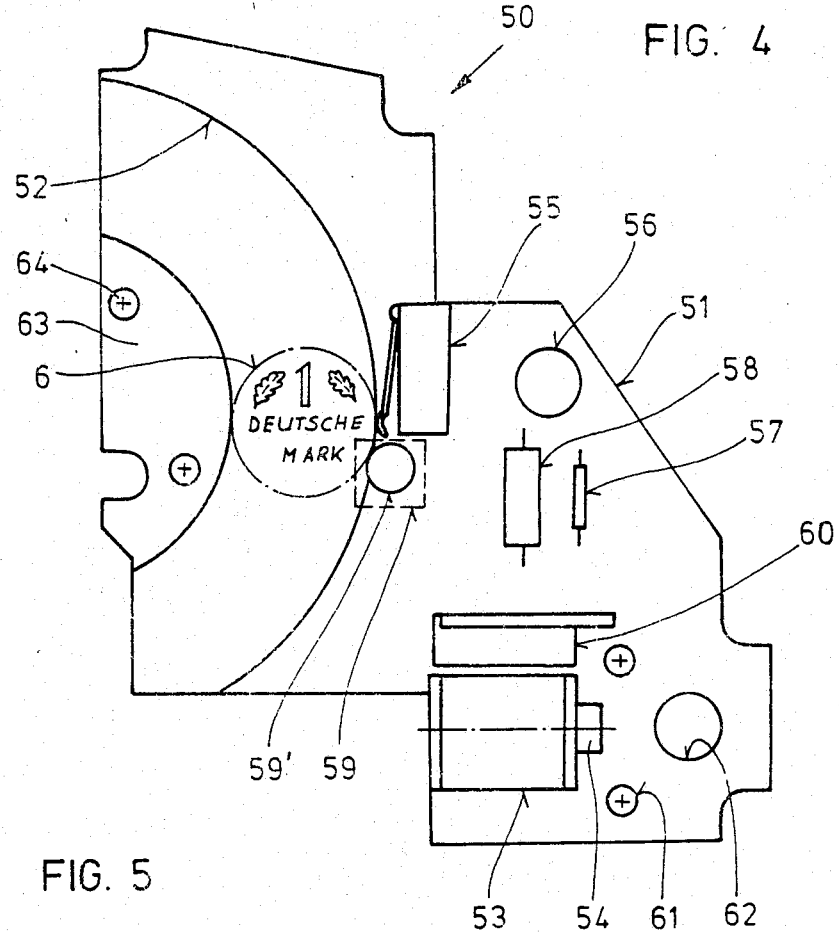
FIG. 4 is a schematic elevational view of the circuit board provided in the clutch and catch according to FIG. 2.
Figure 5:
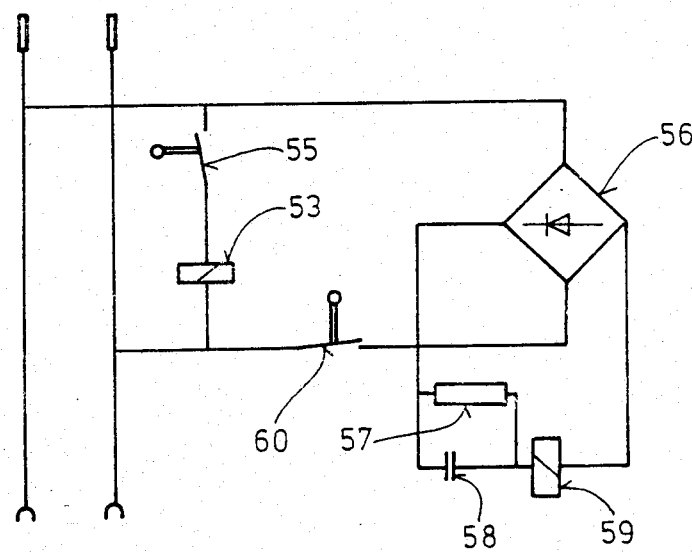
FIG. 5 is a circuit diagram for the electrical circuit elements disposed on the circuit board according to FIG. 4.

Electric power is transmitted by two jacks 36 inserted in the legs 34 of plug 32 as well as by two contact pins 61 which are applied on a circuit board 51 disposed between the housing parts 14 and 15 and which can engage in the jacks 36. As shown in FIG. 4, the circuit board 51 is further provided with a coin chute 52, whose width is variable by means of an exchangeable insert 63 held on pins 64, for the coin 6 to be introduced through a coin slot 17 into the catch 50. These circuit elements consist of a microswitch 55, to be operated with coin 6, a rectifier 56, a resistor 57, a capacitor 58, an additional electromagnet 59 whose armature 59' protrudes into the coin chute 52, and a microswitch 60 to be operated by the right angle plug 32. Further, the circuit board 51 has a cut-out 62 for the spring 25 acting on the plug 32.

When a shopping cart 1" in stacked position according to FIG. 1 has a coin 6 dropped into its coin chute 52 through the coin slot 17, microswitch 55 is actuated and electromagnet 53 is connected to the circuit and hence excited. Armature 54 of magnet 53 is thereby withdrawn from recess 38 of plug 32, and the latter is pushed outward by the force of spring 25, so that the connection with the preceding cart 1' is released and cart 1" can be wheeled away. Coin 6 remains in the position shown in FIG. 4, as it is prevented from dropping through by the armature 59' of magnet 59 projecting into the coin chute 52.

If after shopping and finishing with the cart 1", plug 32 of cart 1" is again introduced into recess 21 of trap 12 of the preceeding cart 1'. Plug 32 is then locked by armature 54 automatically. First, however, due to contact jacks 36 and contact pins 61 an electrical connection is established holding armature 54 back. But simultaneously also a micro-switch 60 is actuated by the plug 32 and hence magnet 59 is momentarily connected to the circuit and excited. Thereby armature 59' is pulled back and the coin 6 present in coin chute 52 is released. This opens switch 55 releasing armature 54 and locking plug 32. With the cart 1" coupled, coin 6 needed for uncoupling can be taken out of the coin chute 52 again. The momentary retraction of armature 59' is a function of rectifier 56, resistor 57 and capacitor 58 which act as a timing circuit.

The clutch member 13 formed as a flexible cable and provided at the coupling device 11, which can easily be fastened on the handle bar 5 of the shopping cart 1 by a clamping plate 18 fastened to the housing parts 14 and 15 by means of screws 19, must indeed be introduced by hand into the trap 12 of the adjacent cart, but due to the flexibility an offset in height can readily be compensated, also no vibrations that necessarily result as carts are coupled and uncoupled are transmitted to the electrical circuit elements, and protective resistances with high current drain causing high current consumption are therefore not required. Yet due to the design of the clutch member 13 as a pull resistant cable and the realization of the trap 12, a firm connection between the individual shopping carts is ensured.

In a device for the coupling of shopping carts 1, 1', 1" with one another or with a fixed electrical supply means 3, consisting of a disengageable clutch 11 formed by a trap 12 and a clutch member 13 for the firm but selectively releasable coupling of shopping carts 1, 1', 1" in a space saving stacked position, and of a catch to be actuated by means of a coin, by means of which when shopping carts are fitted together a clutch member 13 fastened at a cart can be interlocked with the trap 12 on the adjacent cart and the coin can be stopped when the clutch is released and is not released until after another coupling together, the clutch member 13 is formed by a pull resistant cable 31 and a plug, preferably a right angle plug 32, provided at the end of the cable and cooperating with the trap 12 provided at the adjacent cart 1'.

By this design, it is possible securely to connect shopping carts with one another easily and quickly, also on uneven ground, since by the flexible cable any offsets in height can be compensated without difficulties. In addition, no vibrations are passed on by the clutch member 13, hence the circuit elements are not stressed thereby, so that no protective resistances are necessary and the current drain and hence the energy consumption are kept small.

While specific embodiments of the invention have been shown and described in detail to illustrate the application of the principles of the invention, it will be understood that the invention may be embodied otherwise without departing from such principles.

What is claimed is:

1. A device for coupling a carrier such as a shopping cart, comprising a housing adapted to be mounted on the carrier and having a face with an opening forming a coupling trap, a flexible cable having one end secured to said housing and an opposite end extending out of said housing having a plug thereon engageable in a coupling trap from an adjacent carrier, releasable lock means in said housing engageable with said plug to hold it in said trap, means defining a coin chute in said housing, and electrical switch means having an actuator in said chute actuable by a coin and connectable to said lock means to release said lock means, said switch actuator holding the coin in said chute for releasing the coin when said plug is reinserted into said trap, a T-shaped recess formed in a face of said housing which extends perpendicular to the longitudinal axis of the carrier and extends into a side face of said housing, said lock means including an electromagnet having a plunger, said plug having a recess into which the plunger engages when the plug is inserted and electrical contact means in said housing engageable with said plug when said plug is inserted, said T-shaped recess in said housing including an abutment therein extending perpendicular to the longitudinal axis of the carrier, said plug being insertable into said recess up to said abutment.

2. A device according to claim 1, wherein said plug is disposed at right angles to said flexible cable, said plug having an inner end in respect to said trap having a bevel, said electromagnet plunger being displaceable by the bevel during insertion of said plug.

3. A device according to claim 2, wherein said housing has a compression spring extending into the recess which is displaced by insertion of said plug.

4. A device according to claim 1, wherein said cable is attached to said housing and to said plug and has a pull rope extending therethrough which is anchored in said housing.

5. A device according to claim 2, wherein said housing contains circuit elements for operating said lock means plunger.

6. A device according to claim 5, wherein an electrical connection for said plug is effected by a locking jack, said housing engageable with a locking jack of said plug upon insertion of said plug into said trap.

7. A device according to claim 6, wherein said housing is of two part construction containing said lock means and having a circuit board therein forming an electrical connection with said plug when said plug is inserted into the trap.

8. A device according to claim 1 wherein said housing has a slot for a coin extending therethrough defined on one side by an insert having a curved surface over which the coin moves, said insert being removable and being replaceable with an insert having a different surface.

* * * * *